Feb. 10, 1942.  A. E. BAAK  2,272,864

AUTOMATIC CONTROL MECHANISM

Filed Aug. 28, 1939

Inventor
Albert E. Baak
By George H Fisher
Attorney

Patented Feb. 10, 1942

2,272,864

UNITED STATES PATENT OFFICE 2,272,864

AUTOMATIC CONTROL MECHANISM

Albert E. Baak, Minneapolis, Minn., assignor to Minneapolis-Honeywell Regulator Company, Minneapolis, Minn., a corporation of Delaware Application August 28, 1939, Serial No. 292,299

17 Claims. (Cl. 200—140)

This invention is directed broadly to a mechanism for use in automatically controlling a condition and is more specifically concerned with a condition control device which is adapted to actuate a single control member to one position at one condition value and to another position at a second condition value, the operating differential being adjustable. The invention also embraces a single condition responsive device which actuates a first control member at one condition value and a second control member at a second condition value, the values at which each control member is actuated being adjustable.

Differential adjustments are old and well known in the art, but in many of the prior art devices when one of the limits of the differential is adjusted the other limit is also affected. It is therefore one of the objects of this invention to provide a differential adjusting mechanism wherein each limit of the differential is adjustable independently of the other.

Another object of the invention is to make these adjustments simple and readily accessible and to provide scales whereon each limit of the differential may be separately read.

A further object of the invention is to provide a single bellows for actuating two switches, and separate means for independently adjusting the force which the bellows must develop to actuate each switch.

Figure 1:
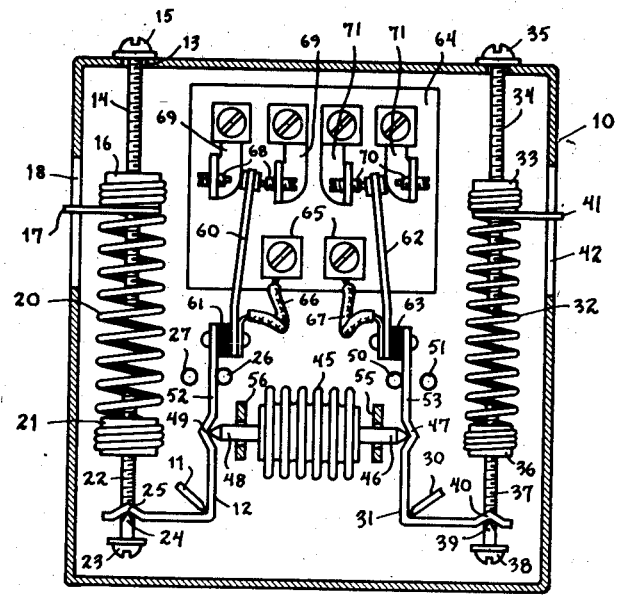
Figure 2:
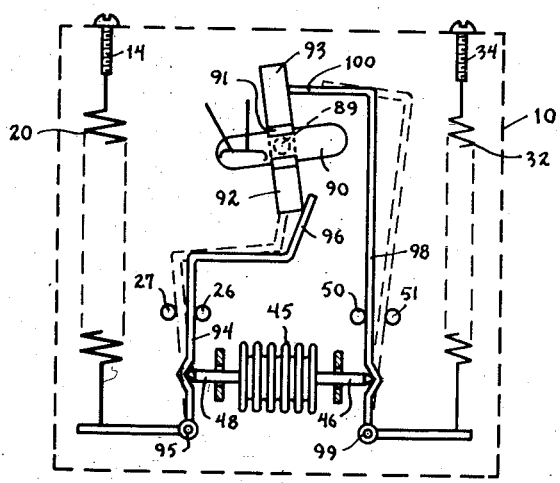

These and other objects will readily become apparent as the following specification is read in the light of the accompanying drawing in which Figure 1 is a front elevation, partly in section, of one form of my invention, and Figure 2 is a more or less diagrammatic view of a slightly different form.

Referring to Figure 1 of the drawing the reference numeral 10 indicates the casing which houses the switching mechanism of my invention. Supported by the casing 10 is a knife edge 11 about which the bell crank lever 12 is adapted to rotate. The top of casing 10 is provided with a hole 13 through which the stem 14 of the screw 15 is inserted. A nut 16 is threaded on the stem 14 and this nut 16 is provided with an arm 17 which extends outwardly through a slot 18 in the side of the casing 10. The upper end of a tension spring 20 is secured to the nut 16 and the lower end of this spring is secured to a second nut 21 screw threadedly mounted upon the stem 22 of the screw 23. The screw 23 carries a knife edge bearing 24 which seats in a depression 25 in the lever 12. The spring and lever are so arranged that the spring tends to rotate the lever in a clockwise direction as viewed in Figure 1. A stop 26 limits such clockwise rotation and a similar stop 27 is provided for limiting the rotation of the lever 12 in the opposite direction.

Directly opposite the knife edge 11 is a second knife edge 30 about which the bell crank lever 31 is adapted to rotate. Lever 31 is biased to rotate in a counter-clockwise direction by means of the tension spring 32 the upper end of which is connected to the nut 33 threaded on the stem 34 of the screw 35 and the lower end of which is secured to the nut 36 threaded on the stem 37 of the screw 38. The screw 38 carries a knife edge 39 which seats in a depression 40 in the lever 31. The nut 33 is provided with an arm 41 which extends outwardly through a slot 42 in the casing 10. The stop 50 limits the rotation of the lever 31 in a counter-clockwise direction and the stop 51 limits its rotation in a clockwise direction.

Located between the two levers 12 and 31 is a bellows 45 having a bearing pin 46 adapted to seat in the depression 47 in the lever 31 and a bearing pin 48 adapted to seat in the depression 49 in the lever 12.

It will be seen that the springs 20 and 32 tend to move the legs 52 and 53 of the levers 12 and 31 toward each other so that normally these two legs clamp the bellows 45 between them thereby supporting the bellows by the coaction of the bearing pins 46 and 48 with the depressions 47 and 49 in the legs 53 and 52, respectively. In addition to this support a pair of guides 55 and 56 are provided to prevent the bellows from being displaced with respect to the two levers. It will be understood however that the pins 46 and 48 are normally not in contact with the guides 55 and 56 so that the bellows is normally entirely supported by the levers 53 and 52.

The bellows 45 may be sealed and filled with a temperature sensitive liquid or it may be connected to a remotely located thermal bulb or to a source of variable pressure by means of a capillary tube. For the purposes of this description it will be assumed that the bellows 45 contains a suitable temperature responsive liquid so that the bellows will expand and contract on variations in temperature.

If the temperature to which the bellows is subjected is at a relatively low value the biasing springs 20 and 32 will have moved the levers 52 and 53 into engagement with the stops 26 and

50, respectively. The spring 32 may be made lighter than the spring 20 so as to exert a smaller biasing force. Assuming this to be the case, as the internal pressure within the bellows 45 increases due to an increase in temperature it will first overcome the force exerted by the spring 32 at which time it will rotate the lever 53 in a clockwise direction until the lever 53 engages the stop 51. On a further increase in temperature the internal force within the bellows 45 will increase and eventually overcome the force exerted by the stronger spring 20 at which time the bellows will rotate the lever 52 in a counter-clockwise direction until it engages the stop 27. On a decrease in temperature the bellows will contract and first permit the spring 20 to rotate the lever 52 into engagement with the stop 26 on a further decrease in temperature will permit the spring 32 to rotate the lever 53 into engagement with the stop 50. It will be noted that each of the springs 32 and 20 are individually adjustable. The adjustments are made by rotating the screws 15 and 35 which causes vertical displacement of the nuts 16 and 33 which are prevented from rotating by the arms 17 and 41 which extend through the slots 18 and 42 in the side of the casing 10. For example, rotating screw 35 in a clockwise direction will cause the nut 33 to move upwardly and increase the tension of the spring 32 thereby increasing the pressure which must be developed within the bellows 45 in order to rotate the lever 53. In this manner the temperature at which each of the levers 53 and 52 will be rotated by the bellows 45 may be independently varied without affecting the other adjustment. In other words, the nut 33 may be moved by means of the screw 35 from the position wherein the arm 41 is at the top of the slot to the position where this arm is at the bottom of the slot. This adjustment varies the temperature at which the bellows 45 rotates the lever 53 but does not affect the temperature at which the bellows will rotate the lever 52. The only way in which this temperature may be adjusted is by varying the tension of the spring 20.

The upper end of leg 52 of the lever 12 carries a contact arm 60 by means of a piece of insulation 61, and the upper end of leg 53 of the lever 31 carries contact arm 62 through the insulating member 63. An insulating panel 64 is connected to the rear of the casing and carries a pair of terminal screws 65 which are connected to the contact arms 60 and 62 by means of conductors 66 and 67, respectively. Stationary contacts 68 are mounted upon brackets 69 carried on the insulating panel 64 for cooperation with the switch arm 60 and contacts 70 are mounted on brackets 71 for cooperation with the contact arm 62.

Figure 1 therefore discloses a single temperature responsive bellows which actuates two switching devices 60 and 62 wherein the temperature at which one of the devices is operated may be adjusted entirely independently of the temperature at which the other of the devices is operated and vice versa. It will be appreciated of course that scale plates may be placed adjacent the slots 18 and 42 for cooperation with the pointers 17 and 41 so that the temperature at which each of the switches will be actuated may be easily read.

Figure 2 shows a slightly different application of my invention wherein a single mercury switch is actuated and wherein each limit of the differential of operation may be independently varied. This modification has been more or less diagrammatically illustrated and the casing 10, springs 20 and 32, adjusting screws 14 and 34, and the bellows 45 are exactly the same as in the modification disclosed in Figure 1. In this case, however, instead of the open contact switches a mercury switch 90 is carried by a member 91 freely pivoted on the rear of the casing 10 as shown at 89. The member 91 is provided with an actuating arm 92 extending downwardly therefrom and an upwardly extending actuating arm 93. Lever 94 which cooperates with the bearing pin 48 of the bellows is pivoted at 95 and is connected to the spring 20 in the same manner as shown in Figure 1. The upper end of the lever 94 is off-set as shown at 96 and cooperates with the actuating arm 92. Lever 98 which cooperates with the bearing pin 46 on the bellows 45 is pivotally mounted at 99 and is connected to the spring 32 in the same manner as in Figure 1. The upper end of the lever 98 is provided with a horizontally extending portion 100 which cooperates with the actuating arm 93. The levers 94 and 98 are also provided with the stops 27, 26, 50 and 51 to limit their rotation in the same manner as in Figure 1.

Assuming that the temperature to which the bellows 45 responds is at a relatively low value the bellows will be in its contracted condition and the springs 20 and 32 will be holding the levers 94 and 98 against the stops 26 and 50, respectively, as is seen in Figure 2. Under these conditions the lever 98 will have rotated the mercury switch in a clockwise direction to move it to its closed position. On an increase in temperature the bellows will first rotate the lever 98 against the stop 51 due to the fact that the spring 32 is weaker than spring 20. This rotation will have no effect upon the position of the mercury switch 90. On a further increase in temperature the bellows 45 will rotate the lever 94 against the stop 27 and the upper end 96 of the lever 94 will engage the actuating arm 92 and rotate the mercury switch in a clockwise direction to its open position. The temperature at which this opening movement occurred is determined entirely by the tension of the adjustable spring 20. On a decrease in temperature the bellows 45 will begin to contract and will first permit the stronger spring 20 to rotate the lever 94 against the stop 26 which will have no effect upon the position of the mercury switch 90. On a further decrease in temperature the bellows 45 will contract and permit the weaker spring 32 to rotate the lever 98 against the stop 50 and as this rotation occurs the upper end 100 of the lever 98 engages the actuating arm 93 and rotates the mercury switch 90 in a counter-clockwise direction to its closed position. The temperature at which this action occurs is controlled entirely by the adjustment of the spring 32.

It is therefore seen that in Figure 2 I have disclosed a bellows which actuates a mercury switch between open and closed positions and wherein the temperature value at which the switch is moved to open position may be adjusted entirely independently of the temperature value at which the switch is moved to closed position and vice versa. It is appreciated of course that the springs 20 and 32 in Figure 2 are adjusted in the same manner as they are in Figure 1 and that these adjustments may be read on the scale plates adjacent the slots 18 and 42 directly in degrees or pounds pressure or whatever the condition may be to which the bellows 45 responds. Moreover, the adjustment screws are readily accessible from outside the casing so that the cover need not be removed in order to make the necessary adjustments of the springs 26 and 32.

As various other changes and modifications of this invention will undoubtedly occur to those who are skilled in the art it should be understood that I am to be limited by the scope of the appended claims and not by the specific embodiments which are disclosed herein.

I claim as my invention:

1. A device of the character described, comprising in combination, a condition responsive device floatingly mounted for expansion in opposite senses, a first element operated by said device as it expands in one sense, a second element operated by said device as it expands in the opposite sense, and means associated with said device for causing it always to expand in one sense before it expands in the opposite sense.

2. A device of the character described, comprising in combination, a condition responsive device floatingly mounted for expansion in opposite senses, a first element operated by said device as it expands in one sense, a second element operated by said device as it expands in the opposite sense, means resisting expansion of said device in one direction, and means to adjust said resisting means.

3. A device of the character described, comprising in combination, a condition responsive device mounted for expansion in opposite senses, a first element operated by said device as it expands in one sense, a second element operated by said device as it expands in the opposite sense, a first means resisting expansion of said device in one sense, and a second means resisting expansion of said device in the opposite sense, one of said means exerting a greater force than the other whereby said device always expands in one sense before the other.

4. A device of the character described, comprising in combination, a condition responsive device mounted for expansion in opposite senses, a first element operated by said device as it expands in one sense, a second element operated by said device as it expands in the opposite sense, a first means resisting expansion of said device in one sense, a second means resisting expansion of said device in the opposite sense, one of said means exerting a greater force than the other whereby said device always expands in one sense before the other, and means for individually adjusting each of said resisting means whereby the condition value at which said device expands in each sense may be individually adjusted.

5. A device of the character described, comprising in combination, a condition responsive device floatingly mounted for slow expansion in opposite senses, a first element operated by said device as it expands in one sense, a second element operated by said device as it expands in the opposite sense, and means for determining the condition value at which said device expands in one sense.

6. A device of the character described, comprising in combination, a condition responsive device floatingly mounted for slow expansion in opposite senses, a first element operated by said device as it expands in one sense, a second element operated by said device as it expands in the opposite sense, and means for independently adjusting the condition value at which said device expands in each sense.

7. In combination, a pair of movable supports, an expansible bellows between said supports and floatingly supported thereby whereby expansion of said bellows moves said supports, means resisting movement of one of said supports by said bellows, and control means actuated by said supports.

8. In combination, a pair of movable supports, an expansible bellows between said supports and floatingly supported thereby whereby expansion of said bellows moves said supports, spring means resisting movement of each of said supports by said bellows, means for adjusting said spring means to vary the force necessary to be developed within said bellows to move each of said supports and control means actuated by said supports.

9. An automatic control device comprising in combination, first and second levers pivoted for rotation toward and away from each other, means biasing said levers for rotation toward each other, said last named means biasing said levers with unequal forces and an expansible and contractible member mounted between said levers and carried by them whereby upon expansion and contraction said levers are sequentially actuated by said member.

10. An automatic control device comprising in combination, first and second levers pivoted for rotation toward and away from each other, means biasing said levers for rotation toward each other, an expansible and contractible member mounted between said levers and carried by them, means to adjust said biasing means to exert a greater force on one of the levers than on the other whereby said other lever will always be moved first on expansion of said expansible and contractible member, and control means actuated by said levers.

11. An automatic control device comprising in combination, first and second levers pivoted for rotation toward and away from each other, means biasing said levers for rotation toward each other, an expansible and contractible member mounted between said levers and carried by them, means to adjust said biasing means to exert a greater force on one of the levers than on the other whereby said other lever will always be moved first on expansion of said expansible and contractible member, and switch means mounted for cooperation with said levers, movement of one of said levers on contraction of said member causing movement of said switch means in one direction and movement of the other of said levers on expansion of said member causing movement of said switch means in the opposite direction.

12. An automatic switching device comprising in combination, first and second movably mounted elements, a first means biasing said first element for movement toward said second element with a relatively small force, a second means biasing said second element for movement toward said first element with a relatively larger force, an expansible and contractible member mounted between and carried by said elements, a pivotally mounted arm, expansion of said member moving said first element and then said second element, said second element rotating said arm in one direction, contraction of said member first permitting movement of said second element by its biasing means and then permitting movement of said first element by its biasing means, movement of said first element rotating said arm in the opposite direction, and switch means actuated by said arm.

13. An automatic switching device comprising in combination, first and second movably mounted elements, a first means biasing said first element for movement toward said second element with a relatively small force, a second means biasing said second element for movement toward said first element with a relatively larger force, an expansible and contractible member mounted between and carried by said elements, a pivotally mounted arm, expansion of said member moving said first element and then said second element, said second element rotating said arm in one direction, contraction of said member first permitting movement of said second element by its biasing means and then permitting movement of said first element by its biasing means, movement of said first element rotating said arm in the opposite direction, switch means actuated by said arm, and means for individually adjusting the force exerted by each biasing means whereby the cut in and cut out points of the switch means may be independently varied.

14. An automatic switching device comprising in combination, first and second movable members, a first means biasing said first member for movement toward said second member, a second means biasing said second member for movement toward said first member, an expansible and contractible condition responsive element mounted between and limiting the movements of said members by their respective biasing means, a first switch actuated by said first member, a second switch actuated by said second member, and means for individually adjusting each of said biasing means whereby the condition value at which each switch is actuated by said condition responsive element may be independently varied.

15. In a device of the character described, a pair of members biased for movement in opposite senses, and an element floatingly mounted between said pair of members, said element expanding and contracting substantially uniformly in response to changes in the value of a condition to move first one and then the other of said pair of members against its bias depending upon which one has the strongest bias.

16. In a device of the character described, a pair of members biased for movement in opposite senses, an element floatingly mounted between said pair of members, said element expanding and contracting substantially uniformly in response to changes in the value of a condition to move first one and then the other of said pair of members against its bias depending upon which one has the strongest bias, and means for independently adjusting the bias of each of said pair of members.

17. A device of the character described, comprising in combination, a condition responsive device floatingly mounted for expansion in opposite senses, a first movable control means, and a second movable control means, said device being normally entirely supported by said two control means, said first control means being moved by said device as it expands in one sense and said second control means being moved by said device as it expands in the opposite sense.

ALBERT E. BAAK.